March 21, 1933.  O. F. NILSSON ET AL  1,902,091
INKSTAND
Filed Aug. 12, 1929   2 Sheets-Sheet 1
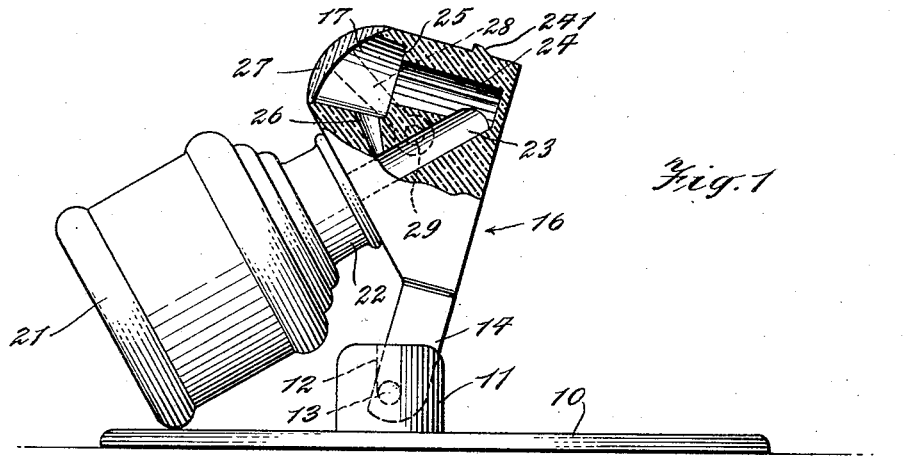
Fig. 1
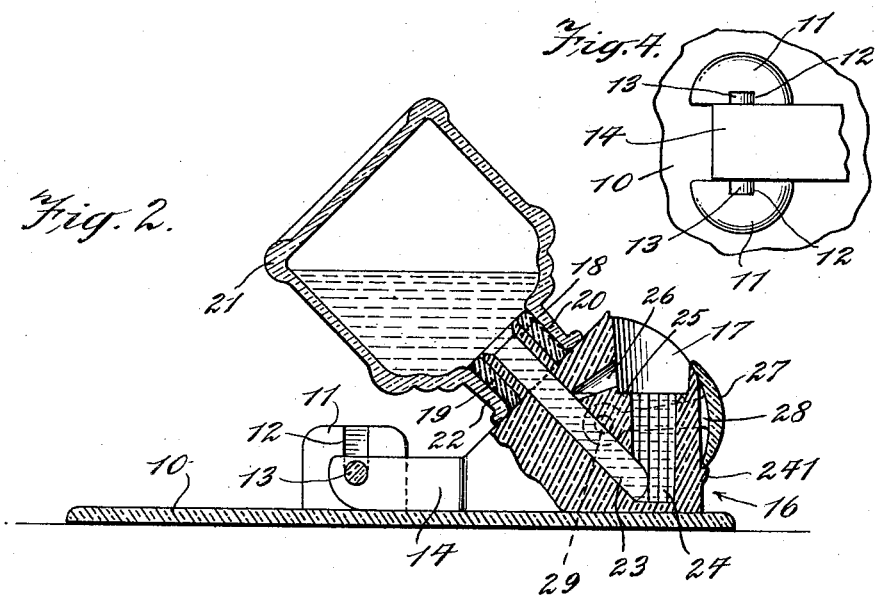
Fig. 2.
Fig. 4.
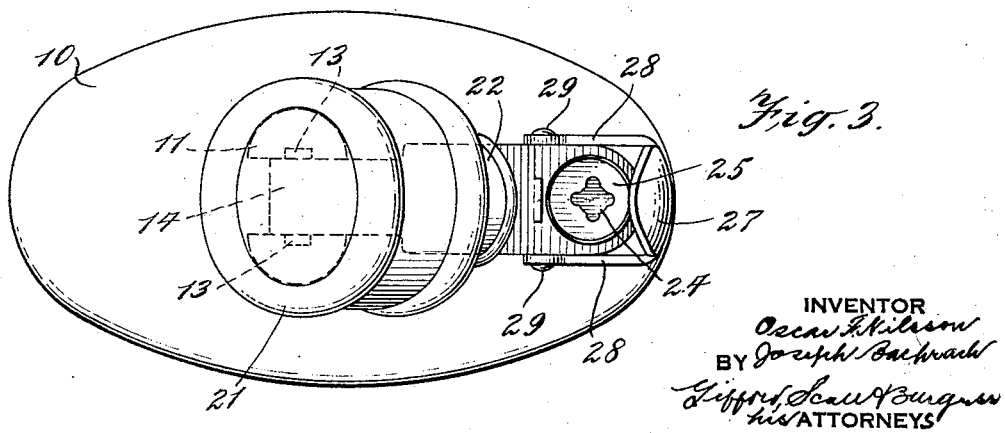
Fig. 3.
INVENTOR
Oscar F. Nilsson
BY Joseph Bachrach
Gifford, Scull & Burgess
his ATTORNEYS

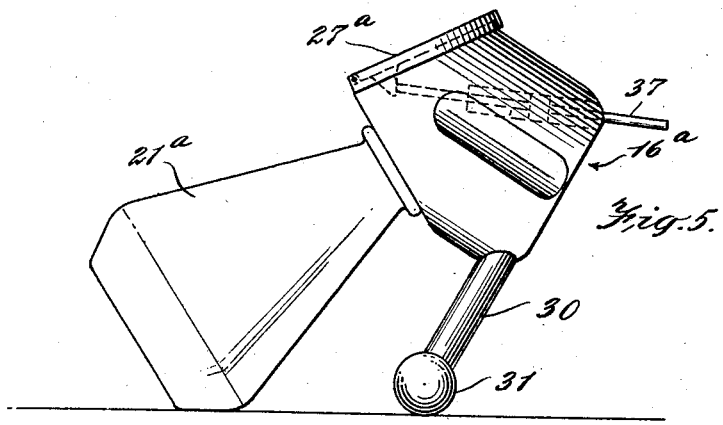
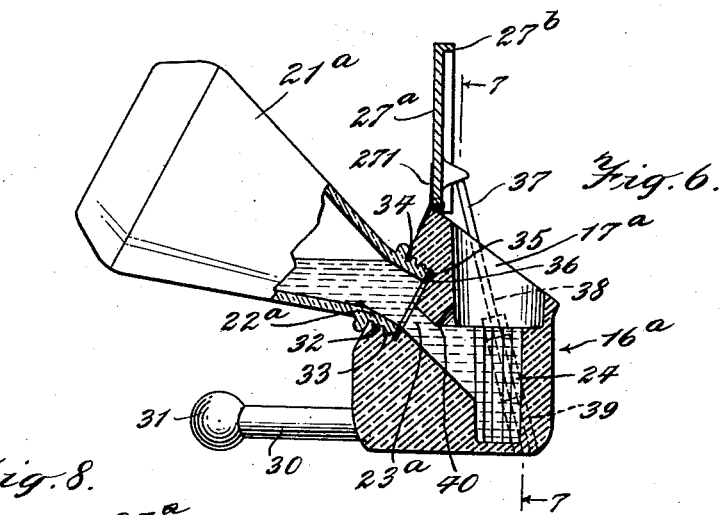
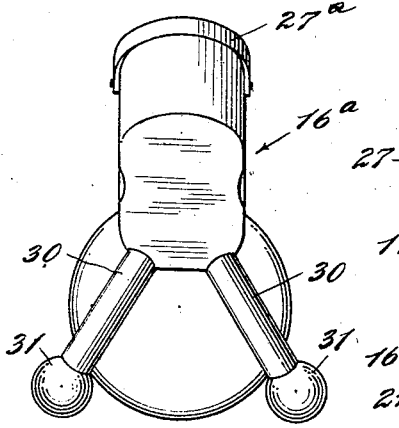
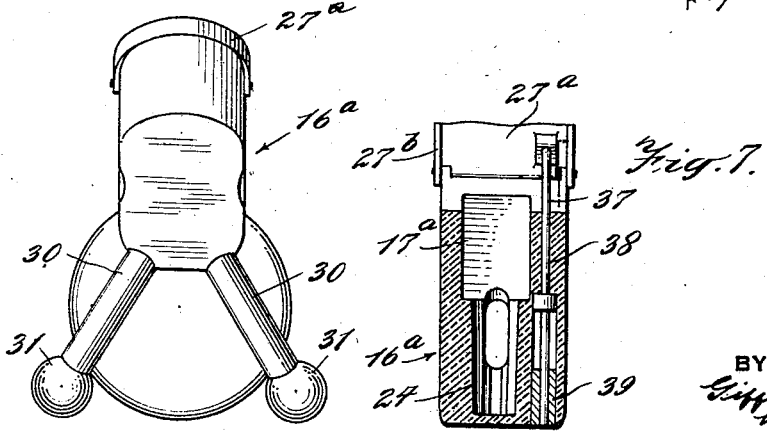

Patented Mar. 21, 1933

1,902,091

UNITED STATES PATENT OFFICE

OSCAR F. NILSSON AND JOSEPH BACHRACH, OF NEW YORK, N. Y., ASSIGNORS TO L. E. WATERMAN COMPANY, OF NEW YORK, N. Y., A CORPORATION OF NEW YORK

INKSTAND

Application filed August 12, 1929. Serial No. 385,233.

Our invention more particularly relates to an ink stand for filling fountain pens, although it will be understood that our invention is not limited to this particular use.

Our invention will best be understood by reference to the accompanying drawings, in which Fig. 1 is a side view, partially in section, of a preferred embodiment of our invention; Fig. 2 is a sectional side elevation similar to Fig. 1, but showing the body member and the attached receptacle in a second position; Fig. 3 is a plan view of Fig. 2; Fig. 4 is a fragmentary plan view illustrating the pivotal connection between the body member and the base; Fig. 5 is a side view of a modified form of our invention; Fig. 6 is a side view, partially in section, of Fig. 5 showing the parts occupying a second position; Fig. 7 is a section taken on the line 7—7 of Fig. 6; and Fig. 8 is an end view of Fig. 5.

Like reference characters indicate like parts throughout the drawings.

Referring now to the drawings and first to Figs. 1 to 4, 10 is a base provided with spaced standards 11, 11, as best shown in Fig. 4, which are formed with recesses 12 on their facing sides in which are received trunnions 13 secured to the plate 14 forming a part of the body member indicated generally at 16.

The body member is provided with a well 17 adapted to receive a fluid, such as ink. In the embodiment of our invention illustrated in Figs. 1 to 4, the body member 16 is provided with a cylindrical member 18 (Fig. 2) which is preferably surrounded by a sleeve 19 formed of soft rubber or other yielding material, and is preferably provided with rings 20.

A receptacle 21 which in Figs. 1 to 3 is shown as an ordinary ink bottle, and which is adapted to contain a comparatively large quantity of ink, is provided with a neck 22 which is adapted to engage the rings 20 of the flexible sleeve 19 and form a liquid-tight joint therewith. The body member and the receptacle 21 are preferably assembled by placing the receptacle 21 in an upright position on a suitable base, and then removing the body member and inserting the sleeve 19 into the neck of the receptacle. The edges of the rings are then bent forward toward the body member, as illustrated in Fig. 2, and serve to resist the removal of the receptacle from the body member and thereby preclude the receptacle being too readily disengaged from the body member.

In the embodiment of our invention illustrated in Figs. 1 to 4, a passage 23 extends through the cylindrical member 18 and the body member and communicates with the well 17.

The well 17 in the body member is provided with an opening 24 of the form in cross section, shown in Fig. 3, which is adapted to receive the nib of a pen or an ordinary writing pen, the body member also being provided with a shoulder 25 which is engaged by the end of the barrel of a fountain pen or the end of the handle of an ordinary pen, and thus limits the movement of the nib or pen into the opening 24. The body member is also provided with a passage 26 communicating with the well 17 above the shoulder 25 and also communicating with the passage 23.

The body member is preferably provided with a cover 27 of the form best shown in Figs. 1 and 3, mounted on arms 28 pivoted as at 29 to the body member, and with a lug 241 which is engaged by one edge of the cover when the parts occupy the position shown in Fig. 2.

The operation of the device illustrated in Figs. 1 to 4 will readily be understood from the foregoing description and is as follows:

In order to assemble the device, the receptacle or ink bottle 21 is disengaged from the body member and a filled ink receptacle is placed in an upright position on the base, or the old receptacle is placed thereon and filled. The body member is then disengaged from the base on which it is mounted and the cylindrical member 18 thereof is inserted in the neck of the receptacle or bottle 21. The body member with the receptacle attached thereto is then pivoted on the base by inserting the trunnions 13 of the body member in the recesses 12 of the standards 11. Then when the body member and the receptacle attached thereto are placed in the position indicated in Fig. 2, the ink flows from the receptacle 21 through the passage 23 into the opening 24, air being admitted through the passage 26 into the receptacle 21. The level of the liquid in the well 17 is determined by the upper lip, as shown in Fig. 2, between the passages 26 and 23, thereby bringing the liquid level in the well slightly below the shoulder 25 and making it impossible for the end of the barrel of a fountain pen or the end of the handle of an ordinary pen to be inserted in the ink in the well, and thereby preventing the fingers of the user of the pen from being soiled by the presence of any ink on the end of the fountain pen barrel or pen handle. In filling a fountain pen with the parts occupying the positions shown in Figs. 2 and 3, the nib of the pen is inserted into the opening 24, the end of the pen barrel engaging the shoulder 25. The fountain pen is then filled in the usual manner.

When the parts occupy the position shown in Figs. 2 and 3, the cover 27 drops to the position shown in Fig. 2 by gravity and engages the lug 241, thereby uncovering the well of the body member.

When the device is not in use, it is tilted to the position illustrated in Fig. 1, the ink in the well flowing through the passage 23 into the receptacle 21, and the air in the receptacle escapes through the passage 26. At the same time the cover 27 moves by gravity to the position shown in Fig. 1 to cover the well and prevent unnecessary evaporation of the ink in the receptacle or any ink that may adhere to the sides of the well, an edge of the cover engaging a wall of the well.

In the embodiment of our invention illustrated in Figs. 5, 6, 7 and 8, the body member $16^a$ is provided with two spaced legs 30, preferably enlarged at their ends as at 31. The receptacle $21^a$ is, in the embodiment here illustrated, attached to the body member $16^a$ by screw threads 32 engaging screw threads 33 formed in an opening 34 in the body member, a suitable washer 35 being interposed between the neck $22^a$ of the receptacle and the shoulder 36 formed at the bottom of the opening 34 in the body member. It will, of course, be understood that in assembling the parts the receptacle $21^a$, which may be full of ink, is placed in an upright position on a suitable base, or the receptacle may be placed on the base and then filled with ink, the body member being screwed onto the top of the receptacle $21^a$ while the latter occupies its upright position, thus preventing any spilling of the ink.

In the embodiment of our invention here illustrated, the cover $27^a$ is automatically actuated by a stem 37 which passes through an opening 38, as indicated in dotted lines in Fig. 6 in the body member, and through a plug 39, also illustrated in dotted lines in Fig. 6, which is inserted in an opening in the body member. Normally the free end of the stem 37 projects beyond the body member $16^a$, as illustrated in Fig. 5, the cover preferably being positively closed and the stem 37 projected beyond the body member by a spring 271 which is coiled around the axis or shaft on which the cover is pivoted. Now when the device is tilted to the operative position illustrated in Fig. 6, the end of the stem 37 engages the base and automatically lifts the cover $27^a$ to the position illustrated in Fig. 6, thereby making the well $17^a$ accessible for filling the pen. In the embodiment illustrated in Figs. 5 to 8, furthermore, there is only the one passage $23^a$ between the receptacle and the well $17^a$, the level of the ink in the well being determined by the lip indicated at 40. When the device is not in use, the device is tilted to the position illustrated in Fig. 5 and the cover, aided by the spring 271, drops to a position over the orifice of the well, the cover in this case preferably being provided with a flange $27^b$ which encloses the upper portion of the body surrounding the well.

It will be noted that the receptacle swings through an angle of less than 90°, in passing from the one position to the other, both in the arrangement shown in Figs. 1 to 4 and in Figs. 5 to 8.

In the form shown in Figs. 1 to 4, the receptacle is shown inclined to the horizontal at an angle of approximately 45°, in Fig. 2. When it is thrown to the tilted position shown in Fig. 1, however, the axis of the receptacle makes an angle of less than 45°; for example, an angle of 35° or 40° with the base, so that in passing from the one position to the other, the receptacle swings through an angle of about 80° or 85°. By limiting the motion of the receptacle in this manner, spilling of the ink is avoided.

In Figs. 5 to 8, the receptacle makes an angle of approximately 40° with the horizontal or base in both the positions shown in Figs. 5 and 6, so that the receptacle swings through an angle of 80°.

So far as we are aware in the design of ink stands, it has been the custom to stand the bottle upright when filling it and to turn it upside down through an angle of 180° when emptying it, and it is new with us to incline the receptacle both in the filling and the emptying positions.

It will be noted that the parts are so constructed and arranged that when they occupy the first position illustrated in Figs. 1 and 5, that the air in the receptacle is in direct communication with the atmosphere. Such an arrangement precludes any variations in the volume of the air in the receptacle, such as would result from variations in the temperature of the atmosphere, from causing the ink to overflow and soil the standard on which it is located. In the absence of such communication between the air in the receptacle and the atmosphere, any changes in temperature would cause an increase in volume of the ink and cause it to overflow.

It will be obvious that the receptacle 21 could be filled with ink by pouring it into the well while the parts occupy the position illustrated in Figs. 1 or 5, by merely raising the cover.

We claim:

1. In combination, a receptacle adapted to contain a comparatively large quantity of fluid, a well adapted to contain a comparatively small quantity of fluid and communicating with the said receptacle, means connecting said receptacle and well, a base, a pivot on the base supporting the connected receptacle and well for movement between two positions, in one of which the receptacle will empty into the well and in the other of which the well will empty into the receptacle, and means to support the receptacle and well in each of said positions.

2. In combination, a receptacle adapted to contain a comparatively large quantity of fluid, a well adapted to contain a comparatively small quantity of fluid and communicating with the said receptacle, means connecting said receptacle and well, a base, a pivot on the base supporting the connected receptacle and well for movement between two positions, in one of which the receptacle will empty into the well and in the other of which the well will empty into the receptacle, and means to support the receptacle and well in each of said positions, the air in the receptacle being in free communication with the atmosphere when the receptacle and well are in the position wherein the well empties into the receptacle.

3. In combination, a receptacle adapted to contain a comparatively large quantity of fluid, a well adapted to contain a comparatively small quantity of fluid and communicating with the said receptacle, means connecting said receptacle and well, a base, and a pivot on the base supporting the connected receptacle and well for movement between two positions, in one of which the receptacle will empty into the well and in the other of which the well will empty into the receptacle, said base engaging the receptacle in one of said positions and the well in the other position, to limit said pivoted movement.

4. In combination, a receptacle adapted to contain a comparatively large quantity of fluid, a well adapted to contain a comparatively small quantity of fluid and communicating with the said receptacle, means connecting said receptacle and well, a base, a pivot on the base supporting the connected receptacle and well for movement between two positions, in one of which the receptacle will empty into the well and in the other of which the well will empty into the receptacle, and means limiting said movement to an angle less than 90° and holding the receptacle and well in each of said positions.

5. In combination, a receptacle adapted to contain a comparatively large quantity of fluid, a well adapted to contain a comparatively small quantity of fluid and communicating with the said receptacle, means connecting said receptacle and well, a base, a pivot on the base supporting the connected receptacle and well for movement between two positions, in one of which the receptacle will empty into the well and in the other of which the well will empty into the receptacle, and means to support the receptacle and well in each of said positions, said receptacle being inclined to said base when in position to empty into said well.

6. In combination, a receptacle adapted to contain a comparatively large quantity of fluid, a well adapted to contain a comparatively small quantity of fluid and communicating with the said receptacle, means connecting said receptacle and well, a base, a pivot on the base supporting the connected receptacle and well for movement between two positions, in one of which the receptacle will empty into the well and in the other of which the well will empty into the receptacle, and means to support the receptacle and well in each of said positions, said well having an opening adapted to receive the nib of a pen and a shoulder to limit the movement of said nib into said opening, and means operative when the receptacle is emptying into the well to maintain the level of ink in the well below said shoulder.

7. In an ink stand, a base having a body member pivoted thereon, said member having a well therein adapted to contain a comparatively small quantity of ink, a receptacle adapted to contain a comparatively large quantity of ink, means for detachably securing said receptacle on said member, said member having a passage connecting the receptacle and the well when the receptacle is secured to the member, said member being movable on its pivot to either one of two positions, in one of which the receptacle is higher than the well so that ink may flow from the receptacle into the well to a predetermined level therein, and in the other of which positions the ink may flow from the well into the receptacle, and means to support the member in each of said positions.

8. In an ink stand, a base having a body member pivoted thereon, said member having a well therein adapted to contain a comparatively small quantity of ink, a receptacle adapted to contain a comparatively large quantity of ink, means for detachably securing said receptacle on said member, said member having a passage connecting the receptacle and the well when the receptacle is secured to the member, said member being movable on its pivot to either one of two positions, in one of which the receptacle is higher than the well so that ink may flow from the receptacle into the well to a predetermined level therein, and in the other of which positions the ink may flow from the well into the receptacle, and means to support the member in each of said positions, said well having an opening adapted to receive the nib of a pen and a shoulder adapted to engage the end of a pen barrel to limit movement of the nib into the opening, said predetermined level being below said shoulder.

9. In an ink stand, a base having a body member pivoted thereon, said member having a well therein adapted to contain a comparatively small quantity of ink, a receptacle adapted to contain a comparatively large quantity of ink, means for detachably securing said receptacle on said member, said member having a passage connecting the receptacle and the well when the receptacle is secured to the member, said member being movable on its pivot to either one of two positions, in one of which the receptacle is higher than the well so that ink may flow from the receptacle into the well to a predetermined level therein, and in the other of which positions the ink may flow from the well into the receptacle, means to support the member in each of said positions, and a cover movably mounted on said well and adapted to move into position to close the well when the well is emptying into the receptacle but to move into position to open the well when the receptacle is emptying into the well.

10. In an ink stand, a base having a body member pivoted thereon, said member having a well therein adapted to contain a comparatively small quantity of ink, a receptacle adapted to contain a comparatively large quantity of ink, means for detachably securing said receptacle on said member, said member having a passage connecting the receptacle and the well when the receptacle is secured to the member, said member being movable on its pivot to either one of two positions, in one of which the receptacle is higher than the well so that ink may flow from the receptacle into the well to a predetermined level therein, and in the other of which positions the ink may flow from the well into the receptacle, means to support the member in each of said positions, and a cover movably mounted on said well and adapted to move by gravity into position to close the well when the well is emptying into the receptacle but to move by gravity into position to open the well when the receptacle is emptying into the well.

OSCAR F. NILSSON.
JOSEPH BACHRACH.